Jan. 5, 1960    H. M. HENSOLDT    2,919,622
EYECAP FOR TELESCOPE
Filed Dec. 3, 1956

INVENTOR
Hans M. Hensoldt
BY
ATTORNEYS

United States Patent Office 2,919,622
Patented Jan. 5, 1960

2,919,622
EYECAP FOR TELESCOPE
Hans M. Hensoldt, Wetzlar, Germany
Application December 3, 1956, Serial No. 625,955
1 Claim. (Cl. 88—1)

This invention relates to telescopes, binoculars and similar visual instruments and more particularly to the eyecap, or as they are sometimes called, the eyecups provided on such instruments to space the last lens element of the eyepiece from the user's eye and to shut out from his eye extraneous light not passing through the instrument. A monocular telescope includes one such eyecap and a binocular telescope includes two.

When on cold days or in the early morning a telescope with an eyecap is applied to the eye, the eyepiece is often misted over by moisture from the warm humid air in front of the eyeball which condenses on the eyepiece in consequence of the temperature difference. In order to surmount this difficulty the present invention provides openings in the eyecap in front of the eyepiece. The passage of air through these openings insures against the condensation of moisture on the eyepiece.

In order to prevent the disturbing passage of light through these openings and into the user's eye, as would occur particularly when the instrument is used in broad daylight, the invention provides means which permit these openings in the eyecap to be closed off.

In a preferred embodiment of the invention the eyecap includes two oppositely-positioned openings and cooperates with a rotatable ring having two correspondingly disposed openings which shift with rotation of the ring. A preferred embodiment of the invention is illustrated in the accompanying drawings in which.

Figure 1:
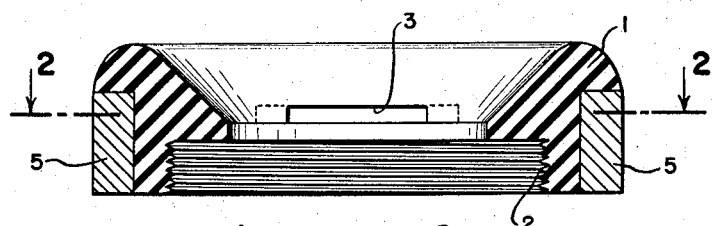
Fig. 1 is a vertical section through an eyecap according to the invention.
Figure 2:
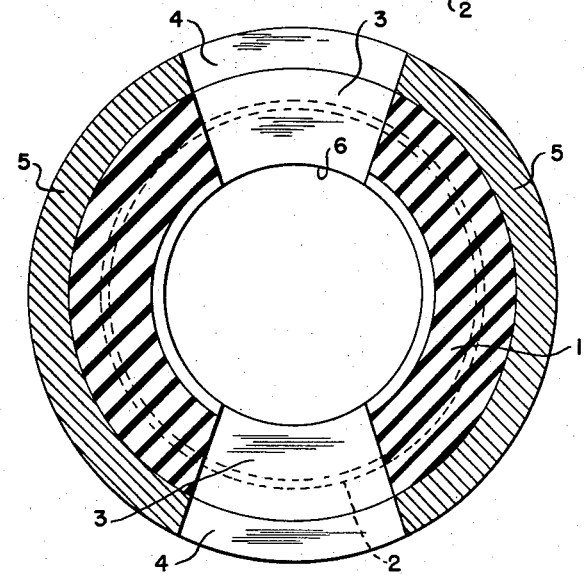
Fig. 2 is a sectional view taken on the line 2—2 of Fig. 1.

The eyecap of the drawings comprises a ring 1, for example of hard rubber or similar material, having an internally threaded portion at 2 by means of which the cap can be screwed onto the barrel of a telescope (not shown). The ring 1 is provided with two oppositely disposed openings or apertures 3 in the side wall thereof (Fig. 2). A second ring 5 is arranged to fit concentrically about the ring 1, in an annular recess provided on the outer surface of the ring 1, and the ring 5 also includes two diametrically opposite apertures 4.

The ring 5 is retained, in the embodiment shown in the drawings, against axial movement relative to the ring 1 by abutment against a shoulder on the telescope barrel.

If the ring 5 is rotated with respect to the ring 1 to put the apertures 3 and 4 in register, as indicated in Fig. 2, when the instrument is held to the user's eye the apertures 3 and 4 permit the passage of air through this space between the user's eye and the eyepiece, the last lens of which fills the central aperture 6 in ring 1. This passage of air prevents moistening over of the eyepiece even when the ambient temperature is very low.

Figure 3:
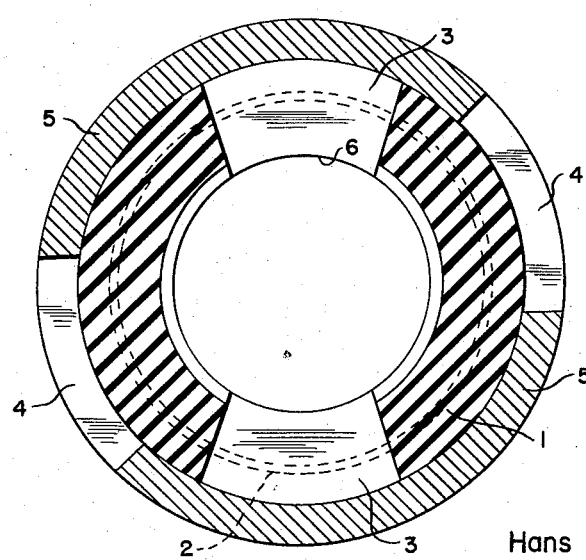
Fig. 3 is a view similar to that of Fig. 2 but illustrating a different relative position of the eyecap and ring.

In Fig. 3 the ring 5 is shown rotated as to close off the apertures 3. This prevents the entry of extraneous light into the eyecap.

While the invention has been described in terms of a preferred embodiment thereof, various other means may be provided within the scope of the invention for closing the openings 3. For example there may be employed angularly disposed air locks. Alternatively there may be employed an axially movable arrangement of the ring 1 or ring 5, one relative axial position of the two closing and the other opening apertures such as the apertures 3.

I claim:

In a telescope, an eyecap comprising a first ring counter-bored and internally threaded from one end for attachment to a telescope and having an interior conical surface at the other end for accommodation to the user's eye, said first ring further having a cylindrical exterior surface of lesser diameter than the outer diameter of said ring at said other end thereof, said cylindrical surface extending from said one end to a limit beyond the bottom of said counter-bore, said first ring being apertured through the side wall thereof to said cylindrical surface between the bottom of said counter-bore and said limit, and a substantially cylindrical ring of interior diameter mating with said cylindrical surface and of height at least equal to the height of said cylindrical surface, said cylindrical ring having apertures therein mating with the apertures in said first ring for at least one relative rotational position of said rings, the circumferential extent of said apertures at said cylindrical surface being less than that of the spaces between them, whereby for other rotational positions of said rings said apertures are closed off.

References Cited in the file of this patent

UNITED STATES PATENTS

| | | |
|---|---|---|
| 1,270,772 | Bausch | July 2, 1918 |
| 1,668,975 | Paulus et al. | May 8, 1928 |
| 1,990,208 | Sager | Feb. 5, 1935 |

FOREIGN PATENTS

| | | |
|---|---|---|
| 14,224 | Great Britain | Apr. 11, 1907 |
| 16,543 | Great Britain | Apr. 9, 1914 |
| 116,270 | Australia | Dec. 24, 1942 |
| 146,437 | Australia | May 9, 1952 |